M. Mead.
Upsetting Tires.
No. 34,156. Patented Jan. 14, 1862.

Witnesses:
Wm C M Alexander
H. A. Yeatman

Inventor:
M. Mead

United States Patent Office.

MARVIN MEAD, OF BATTLE CREEK, MICHIGAN.

IMPROVEMENT IN TIRE-UPSETTING MACHINES.

Specification forming part of Letters Patent No. 34,156, dated January 14, 1862.

*To all whom it may concern:*

Be it known that I, MARVIN MEAD, of Battle Creek, in the county of Calhoun and State of Michigan, have invented certain new and useful Improvements in Machines for Upsetting Tires; and I do hereby declare that the following is a full, clear, and exact description of the same, reference being had to the accompanying drawing, and to the letters of reference marked thereon.

The nature of my invention consists in constructing and arranging the several devices hereinafter described in the manner set forth.

In the annexed drawing, which is a plan view of my invention, A represents the bed or frame upon which the several parts of the machine are secured.

B B represent two arms, which are pivoted to each other at one end, and to the bed A, as represented at $x$ in the figure. To the other ends of these arms are pivoted the levers D D, as seen at $a\ a$, said levers D being in the form represented, and connected at one end by means of a ball-joint to the concave clamps F F. The other ends of the levers D D are connected to the levers E E by means of the connecting-pieces C C. The levers E are hinged together, and to the bed A at one end, as shown, their other ends playing freely and answering the purpose of handles, by which the machine is operated.

Figure 1:
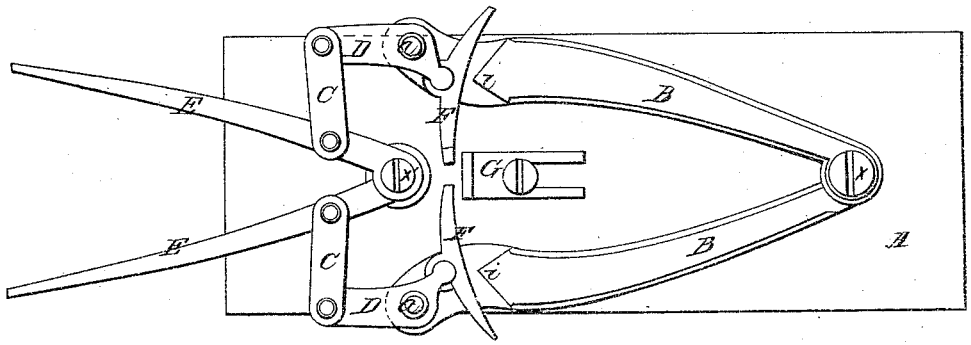
Figure 2:
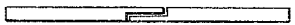

G represents a movable rest or anvil, which is secured to the bed A, and which may be adjusted to or from the tire to be upset, as may be desired by the operator. A portion of the metal on the ends of the arms or near the ends of said arms B B is cut away, and two sharp corners are formed, as seen at $i\ i$. The tire is caught between the clamps F and these points, and is thus securely held. The two ends of the clamps F which are nearest together are formed so that they will lap when brought together, as shown in Fig. 2.

On using this machine the two arms B B are opened, and so are the levers E E. The rest or anvil G is then adjusted in proper position, and the tire being heated is placed between the concave clamps and the points $i\ i$. The levers E E are then moved toward each other, by which means the tire is at the same time clamped and upset. This operation may be gradually or quickly repeated. Thus it will be seen that the machine is operated by the use of the levers E E, and that its operations are quick and effective.

Having thus fully described my invention, what I claim as new, and desire to secure by Letters Patent, is—

The employment of the concave adjustable clamps F F when arranged and used with the arms B B, the levers D E, the connecting-rods C C, and rest G, the clamps being connected to the levers D by means of a ball-joint, and their ends being formed so as to lap or joint on the outside of the tire, as and for the purpose specified.

MARVIN MEAD.

Witnesses:
J. W. C. CLARK,
STEPHEN HUNT.